United States Patent [19]
Fieler et al.

[11] Patent Number: 5,377,758
[45] Date of Patent: Jan. 3, 1995

[54] METHOD FOR EFFECTIVE PLACEMENT OF A LONG LIFE SCALE INHIBITOR

[75] Inventors: Eleanor R. Fieler, Dallas, Tex.; John Hen, Skillman, N.J.; Alfred R. Jennings, Jr., Plano, Tex.

[73] Assignee: Mobil Oil Corporation, Fairfax, Va.

[21] Appl. No.: 55,594

[22] Filed: May 3, 1993

[51] Int. Cl.$^6$ .................. E21B 41/02; E21B 43/25
[52] U.S. Cl. .................. 166/279; 166/269; 166/902
[58] Field of Search .......... 166/279, 310, 902, 305.1, 166/269, 291, 244.1; 507/90

[56] References Cited

U.S. PATENT DOCUMENTS

| | | | |
|---|---|---|---|
| 3,483,925 | 12/1969 | Slyker | 166/279 |
| 4,387,770 | 6/1983 | Hill | 166/269 |
| 4,842,068 | 6/1989 | Vercaemer et al. | 166/269 |
| 4,883,124 | 11/1989 | Jennings, Jr. | 166/307 |
| 4,947,934 | 8/1990 | Hen | 166/279 |
| 5,060,728 | 10/1991 | Yan | 166/279 |
| 5,089,150 | 2/1992 | Hen | 252/8.552 |

*Primary Examiner*—Stephen J. Novosad
*Attorney, Agent, or Firm*—Alexander J. McKillop; George W. Hager, Jr.; Charles A. Malone

[57] ABSTRACT

A method for placement of a long life scale inhibitor into a formation where variable density scale inhibitors are utilized. A substantially low density non-reactive fluid is loaded into an interval of the formation to be treated. Afterwards, a high density first stage scale inhibitor is injected into the interval. Thereafter, a low density spacer fluid is injected into the interval being treated. Next, a second stage high density scale inhibitor having a density lower than the first stage inhibitor is injected into said interval. Subsequently, a low density spacer is injected into the interval. Volume increments are repeatedly injected with decreasing fluid densities until a desired zone has been treated. The entire treatment is then overflushed with an inert high density fluid. Use of this method allows even inhibitor distribution in intervals of a formation with permeability variations thereby preventing scale build-up.

9 Claims, 1 Drawing Sheet

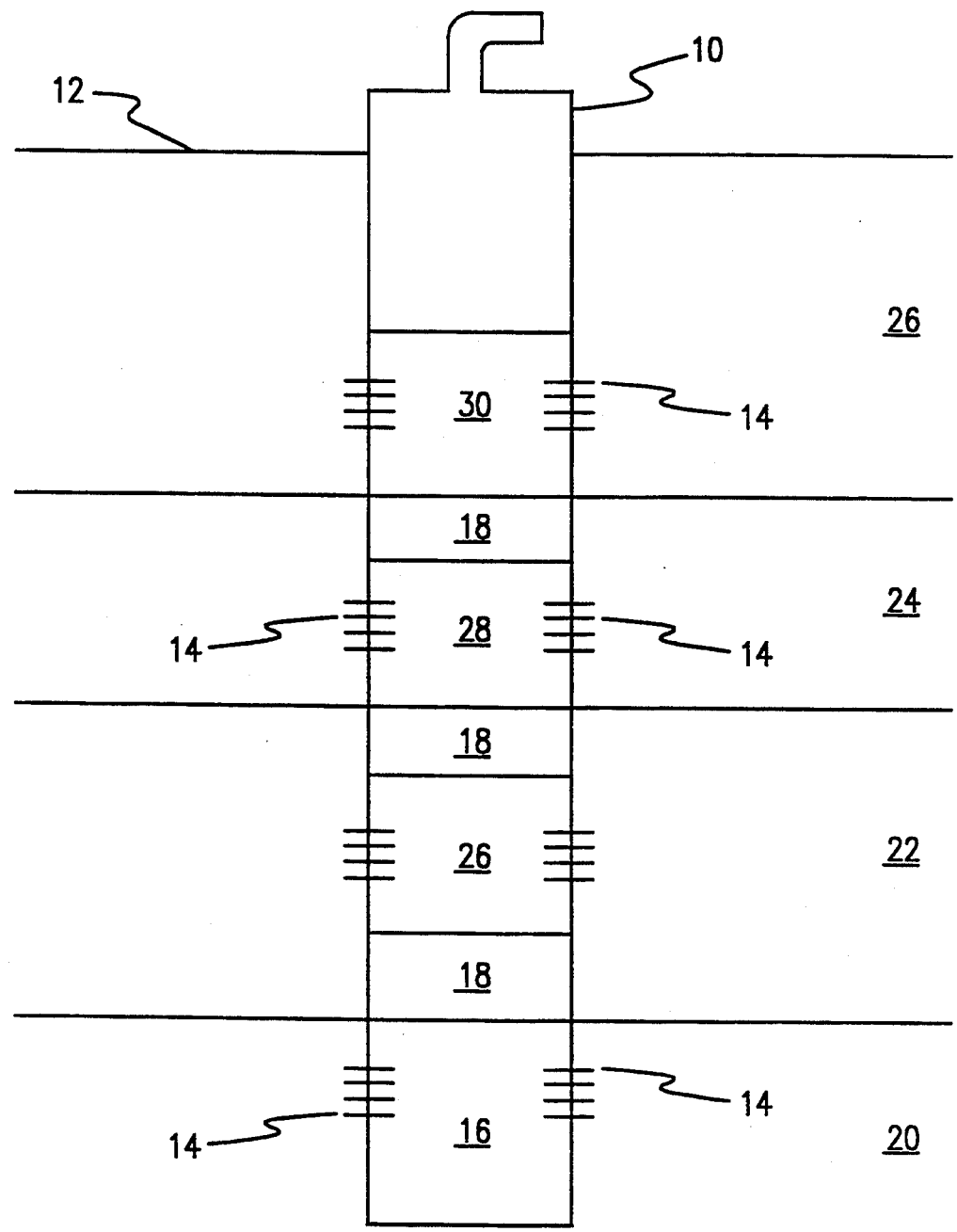

METHOD FOR EFFECTIVE PLACEMENT OF A LONG LIFE SCALE INHIBITOR

FIELD OF THE INVENTION

This invention is related to methods for inhibiting scale formation. Specifically, it is directed to a method for effectively placing a scale inhibitor in all desired intervals of a subterranean formation with varying permeabilities.

BACKGROUND OF THE INVENTION

Scale deposits frequently occur in the production of water, oil and gas from subterranean formations and can result in plugged well bores, plugged well casing perforations, plugged tubing strings, stuck downhole safety valves as well as other valves, stuck downhole pumps and other downhole and surface equipment and lines, scaled formations and fractures in the vicinity of the well. Scale formation can occur as a result of mixing incompatible waters in the well which produce precipitates, or as a result of temperature and pressure changes in the produced waters during production. Generally, incompatible waters occur in water-flooding, as injected sea water mixes with formation water in the borehole during water breakthrough. The more common concern is scale deposited due to changes in supersaturation or solubility of minerals in the formation or produced waters caused by pressure and temperature changes, or changes in other physical and chemical parameters, such as gas compositions, ratio of gas/oil/water. Scale may also be formed from corrosion of metal equipment used in the subterranean oil and gas production. Scale formation is also a problem in aqueous systems used in cooling towers, boilers and the like. Precipitation frequently encountered as scale includes calcium carbonate, calcium sulfate, barium sulfate, magnesium carbonate, magnesium sulfate, and strontium sulfate.

Scale formation can be reduced by the introduction of inhibitors into the formation. Various inhibitors are known, including carboxylated polymers, organophosphates, and polyphosphonates. Typically, carboxylated polymers are polymers and copolymers of acrylic or methacrylic acids, commonly referred to as polyacrylic acids. Organophosphorous-containing inhibitors include alkyl ethoxylated phosphates; ethylenediaminetetramethylene phosphonic acid; aminotrimethylene phosphonic acid; hexamethylenediaminetetramethylene phosphonic acid; diethylenetriaminepentamethylene phosphonic acid; hydroxyethylidenediphosphonic acid and polyvinyl phosphonic acid. The injection of scale inhibitors without pre or post cross-linking to protect an oil or gas well from mineral scale formation is widely practiced. However, such treatments often result in poor retention in the subterranean formation, quick depletion and frequent re-treatments.

Often scale inhibitors are injected into a wellbore to prevent scale from forming along the vertical interval of a wellbore that fluidly communicates with the formation via perforations. Frequently, these intervals contain permeabilities that vary from each other. Desired scale inhibitors are usually injected into the wellbore at rates and pressures sufficient to pump the inhibitor into the intervals at pressures below fracturing pressures. When intervals or zones have permeability variations, an uneven distribution of the inhibitor can result.

Therefore, what is needed is a method to effectively place a scale inhibitor evenly into intervals of a formation where said intervals contain varying permeabilities.

SUMMARY OF THE INVENTION

In the practice of this invention, a desired low density non-reactive aqueous salt solution is injected into a perforated vertical wellbore where some of it enters an interval to be treated. Afterwards, a scale inhibitor having a density substantially higher than the non-reactive aqueous salt solution is injected into the wellbore where it falls below any remaining salt solution in the wellbore. Following the injection of the scale inhibitor, a spacer volume of an aqueous salt solution, having a density lower than the inhibitor's density, is injected into the wellbore. Thereafter, a second slug or stage of scale inhibitor having a density lower than the first scale inhibitor but higher than the aqueous salt solution, is injected into the wellbore. Subsequently, an aqueous salt solution having a density lower than the second scale inhibitor, is injected into the wellbore.

Injection of the scale inhibitors of decreased density and a spacer volume of aqueous salt solution is repeated until all intervals of the formation are treated as desired. Once all intervals have been treated as desired, a non-reactive aqueous salt solution having a density higher than any of the scale inhibitors or salt solutions previously utilized, is injected into the wellbore thereby forcing all of the previous scale inhibitors and salt solutions into the formation. In this manner, scale inhibitor is effectively placed into desired intervals so as to prevent scale formation therein.

It is therefore an object of this invention to provide for a scale inhibitor placement method where different scale inhibitor stages can be effectively modified to fit a variety of zone types, thicknesses, and depths.

It is another object of this invention to provide for a scale inhibitor placement method which does not utilize diverting agents so as to facilitate cleanup after placement of scale inhibitor into all desired intervals.

It is yet still another object of this invention to obtain a more efficient placement of scale inhibitor into all desired intervals of a formation while substantially reducing the volume of scale inhibitor utilized.

BRIEF DESCRIPTION OF THE DRAWINGS

The drawing is a schematic representation which shows scale inhibitor and non-reactive fluid placement in a well at different levels or intervals of a formation.

DESCRIPTION OF THE PREFERRED EMBODIMENTS

In the practice of this invention, referring to the drawing, a pore volume of a low density non-reactive aqueous salt solution is injected into wellbore 10 in amount sufficient to load all of the productive intervals with said salt solution. This salt solution must be compatible with the producing formation and will have a density of about 12 pounds per gallon. Thereafter, a first stage pore volume of a high density scale inhibitor 16 sufficient to treat an interval of a formation to prevent scale formation is introduced into wellbore 10 where it enters productive interval 20 via perforations 14 until it reaches a level above perforations 14 in wellbore 10. The density of this first slug or stage of scale inhibitor is higher than the density of the non-reactive aqueous salt solution and any of the scale inhibitor stages that will be subsequently injected into the wellbore. The density of the first stage scale inhibitor is about 11.5 to about 12.0 pounds per gallon.

Since the first stage scale inhibitor has the highest density, it forces the non-reactive aqueous salt solution or low density spacer and any other fluids into the formation as it falls to the bottom of wellbore 10. Subsequently, another low density spacer 18 is directed into wellbore 10 where it remains over the first stage scale inhibitor due to its density which is less than the density of the scale inhibitor. The density of spacer 18 will be about 11.0 to about 11.5 pounds per gallon. Although spacer 18 remains above the first stage scale inhibitor, it does not enter the perforations which communicate with productive interval 22. The scale inhibitor and low density spacer are injected into the wellbore and formation at a pressure less than the fracturing pressure of the formation. Upon entering the formation the inhibitor reacts with the formation so as to prevent scale formation in the interval and perforations that communicate with the well. The low density spacer serves to reduce the amount of scale inhibitor utilized and allows for a more precise placement of said inhibitor into an interval.

While the first stage inhibitor and spacer remain in wellbore 10, a second stage inhibitor having a density less than the first stage inhibitor and spacer therebelow, is injected into wellbore 10 where it enters productive interval 22 via perforations therein until it fills the wellbore to a desired level thereabove. The density of this second stage inhibitor will be about 10.5 to about 11.0 pounds per gallon. Afterwards, a spacer having a density lower than the second stage inhibitor is injected into the wellbore until it reaches a level just below perforations which communicate with productive interval 24. When this occurs, injection of this spacer ceases. The density of this spacer will be about 10.0 to about 10.5 pounds per gallon.

In order to treat another productive interval, a third stage inhibitor 28 having a density less than the second stage inhibitor and spacer, is injected into the wellbore whereupon it enters productive interval 24 via perforations 14 and fills the wellbore area adjacent thereto. Once the wellbore is filled with inhibitor adjacent to productive interval 24, spacer 18 is placed over the third stage inhibitor. This spacer will have a density less than the third stage inhibitor. The density of the third stage inhibitor will be about 9.5 to about 10.0 pounds per gallon, while the density of the spacer thereabove will be about 9.0 to about 9.5 pounds per gallon.

Afterwards, a fourth stage inhibitor 30 is injected into the wellbore so as to enter productive interval 26 via perforations 14. Injection of this fourth stage inhibitor is continued until it has entered interval 26 and filled the wellbore just above the perforations therein. The density of the fourth stage inhibitor is less than the density of the third stage inhibitor and spacer thereabove and will be about 8.5 to about 9.0 pounds per gallon.

Where there are additional productive intervals in the formation, these scale inhibitor and spacer sequences can be repeated until all desired productive intervals have been treated. By placing the inhibitor and spacer with lessened density values into the formation and wellbore as described above, all productive intervals of a lengthy pay in a vertical or deviated wellbore can be treated with scale inhibitor so as to substantially prevent scale forming in the intervals and perforations communicating with the wellbore. When all productive intervals have been treated, all of the inhibitor stages and spacers remaining in the wellbore are overflushed with a non-reactive aqueous salt solution having a density greater than any of said stages of spacers. This overflush salt solution will have a density of about 8.5 to about 12.0 pounds per gallon. Being heavier than the other inhibitor stages and spacers, the overflush salt solution forces them into the formation. After the treatment is completed, the well is placed on production.

In lieu of injecting the scale inhibitor and spacer into the wellbore, a coiled tubing can be used to more effectively and precisely place the inhibitor or spacer into the wellbore. The coiled tubing can consist of a one-inch or other small pipe which is wound on a spool at the surface of wellbore 10. Either the inhibitor or the spacer can be placed therein and deposited at a desired location within the wellbore.

In U.S. Pat. No. 4,947,934, issued Aug. 14, 1990 Hen discloses the use of a polyacrylate inhibitor system, cross-linked with chromium, that could be used herein. This patent is hereby incorporated by reference herein.

A scale inhibitor that can be used herein is disclosed by Hen in U.S. Pat. No. 5,089,150 that issued on Feb. 18, 1992. This patent is hereby incorporated by reference herein. As disclosed therein, scale inhibitor life was effectively lengthened by cross-linking a carboxylic acid-containing polymeric or organophosphorus-containing inhibitor with a polyalcohol. Significant extension of life was afforded by cross-linking with a polyalcohol which made this inhibitor particularly beneficial for use in oil fields prone to mineral scaling.

Yet another scale inhibitor, disclosed in U.S. Pat. No. 5,060,728, issued to Yan on Oct. 29, 1991, is hereby incorporated by reference herein. Time release inhibitors were formed by cross-linking a polyacrylic acid compound of a controlled molecular weight from about 1,000 to about 10,000 with trivalent chromium cations to produce a water-soluble complex. This complex progressively releases the inhibitor from the formation over an extended period of time.

The amount of scale inhibitor employed will vary according to the radial distance from the well to the interval that is to be treated and will be up to about 15 feet, but in most cases will not exceed about 10 feet from the well or wellbore. The amount of scale inhibitor in a stage will also vary according to the extent to which the interval of the formation is to be treated. Preferably, the amount of scale inhibitor would be one hydrocarbon pore volume of the interval of the formation to be treated. However, lesser amounts may be employed. Generally, the amount employed will be that ordinarily employed in conventional, commercial scale treating operations.

A non-reactive fluid or low density spacer which may be used herein includes salts of alkali or alkaline-earth metals in aqueous solutions and mixtures thereof. Zinc chloride solutions may also be used. The non-reactive fluid or low density spacer should have a density of a least 0.1 greater than the density of the acid stage therebelow. Although sodium chloride, potassium chloride, calcium chloride, and zinc chloride may be used, bromides of these salts may also be utilized. The specific gravity of the acid stage can range from about 1.05 to about 1.10 at room temperature. These salts are disclosed in U.S. Pat. No. 4,883,124 which issued to A. R. Jennings, Jr. on Nov. 28, 1989. This patent is hereby incorporated by reference herein.

Although not required for practice of the art described herein, it is recommended the spacer fluid(s) contain at least 200 ppm but not more than 500 ppm of the inhibitor to ensure all fluids injected into the formation contain inhibitors.

Obviously, many other variations and modifications of this invention, as previously set forth, may be made without departing from the spirit and scope of this invention as those skilled in the art will readily understand. Such variations and modifications are considered part of this invention and within the purview and scope of the appended claims.

What is claimed is:

1. A method for effective placement of a scale inhibitor in a formation where variable density scale inhibitors are utilized comprising:
   a) loading via a wellbore all productive intervals of the formation with a low density non-reactive fluid which fluid is compatible with the composition of the formation;
   b) injecting a first stage scale inhibitor into the wellbore which inhibitor has a density greater than the non-reactive fluid and is sufficient in density to flow to the bottom of the wellbore so as to be in fluid communication with a lower productive interval of the formation;
   c) injecting thereafter a low density spacer or non-reactive fluid into the wellbore which spacer has a density less than the first stage scale inhibitor;
   d) injecting next a second stage scale inhibitor into the wellbore which inhibitor has a density less than the first stage inhibitor spacer injected in step c) which precludes liquid scale inhibitor from mixing with each other as the second stage inhibitor enters a productive interval above the interval in step b);
   e) injecting a spacer into the wellbore above the second stage scale inhibitor which spacer has a density less than the spacer in step c) and previously injected inhibitor stages thereby preventing mixing of the liquids;
   f) repeating the scale inhibitor stages and spacer injections with decreasing densities of liquids until all desired productive intervals have been treated with scale inhibitor; and
   g) overflushing all intervals of the formation with a non-reactive fluid that has a density greater than any of the previously injected inhibitor stages or spacers thereby forcing them into the intervals and preventing scale build-up.

2. The method as recited in claim 1 where the wellbore is vertical or deviated.

3. The method as recited in claim 1 where the inhibitor is obtained by cross-linking a carboxylic acid-containing polymeric or organophosphorus-containing inhibitor with a polyalcohol.

4. The method as recited in claim 1 where the non-reactive fluid or spacer comprises an aqueous salt solution selected from a member of the group consisting of sodium chloride, potassium chloride, zinc chloride, sodium bromide, potassium bromide, or zinc bromide.

5. The method as recited in claim 1 where the density of the first stage scale inhibitor is from about 11.5 to about 12.0 pounds per gallon.

6. The method as recited in claim 1 where the density of the second stage scale inhibitor is from about 10.5 to about 11.0 pounds per gallon.

7. The method as recited in claim 1 where in step f) a third stage scale inhibitor is injected into the wellbore which inhibitor has a density of about 9.5 to about 10.0 pounds per gallon.

8. The method as recited in claim 1 where in step f) a third and fourth stage scale inhibitor are injected into the wellbore which third stage inhibitor has a density greater than the fourth stage inhibitor with a spacer therebetween which fourth stage inhibitor has a density of about 8.5 to about 9.0 pounds per gallon.

9. The method as recited in claim 1 where the density of the non-reactive fluid or spacer is from about 9.0 to about 12.0 pounds per gallon.

* * * * *